United States Patent

Takane et al.

[11] Patent Number: 5,850,487
[45] Date of Patent: Dec. 15, 1998

[54] DIGITAL IMAGE PROCESSING APPARATUS

[75] Inventors: Yasuo Takane; Masahiro Konishi, both of Asaka, Japan

[73] Assignee: Fuji Photo Film Co., Ltd., Kanagawa, Japan

[21] Appl. No.: 426,839

[22] Filed: Apr. 24, 1995

[30] Foreign Application Priority Data

Apr. 25, 1994 [JP] Japan ................................. 6-086863

[51] Int. Cl.⁶ ........................... G06K 9/32; H04N 5/262; H04N 9/64
[52] U.S. Cl. ......................... 382/298; 382/300; 348/240; 348/721
[58] Field of Search ............................. 358/906; 386/38; 348/704, 715, 716, 567, 561, 240, 222, 571, 207, 264, 358, 441, 445, 580, 721; 382/298, 300, 284; 345/127, 128, 129, 130, 131

[56] References Cited

U.S. PATENT DOCUMENTS

| | | | |
|---|---|---|---|
| 4,668,985 | 5/1987 | Kurashige et al. | 348/721 |
| 4,712,140 | 12/1987 | Mintzer et al. | 382/298 |
| 4,809,345 | 2/1989 | Tabata et al. | 382/300 |
| 4,872,064 | 10/1989 | Tutt et al. | 382/298 |
| 5,268,758 | 12/1993 | Nakayama et al. | 358/162 |
| 5,283,651 | 2/1994 | Ishizuka | 348/240 |

FOREIGN PATENT DOCUMENTS

| | | | |
|---|---|---|---|
| 3139773 | 6/1991 | Japan | G06F 15/66 |
| 4157988 | 5/1992 | Japan | H04N 5/262 |

*Primary Examiner*—David K. Moore
*Assistant Examiner*—Wenpeng Chen

[57] ABSTRACT

Digital image signals in each small block of m×n picture elements are read out from a first image memory, which stores the digital image signals for one screen, to be stored in block memories BM1Y, BM2Y, BM1C and BM2C, and the electric zoom processing together with the interpolation operation for the digital image signals in each small block are carried out in a zoom block. A picture element in the horizontal direction in a small block partially overlaps a picture element in a small block which is next to the above-mentioned small block in the horizontal direction. As a result, the interpolation processing in the horizontal direction can be also carried out on the boundary of the small blocks. And, the order to read out the digital image signal from the first image memory and the order to write the digital image signal in the block memory are changed so that the longitudinal-lateral conversion and the right-left conversion of an image can be carried out. Furthermore, in the zoom block, the contour correction for the digital image signal in the vertical direction is performed in accordance with the digital image signal in each small block, which has been zoom-processed.

16 Claims, 12 Drawing Sheets

|  |  |  |  |  |  |  |
|---|---|---|---|---|---|---|
| 2n−1 | Cb | Cr | Cb | Cr | Cb | Cr |
| 2n | Cr | Cb | Cr | Cb | Cr | Cb |
| 2n+1 | Cb | Cr | Cb | Cr | Cb | Cr |

FIG.11(A)

| 1 | 17 | — | 225 | 241 |
|---|---|---|---|---|
| 2 | 18 | — | 226 | 242 |
| \| | \| | — | \| | \| |
| 15 | 31 | — | 239 | 255 |
| 16 | 32 | — | 240 | 256 |

NORMAL

FIG.11(B)

| 16 | 15 | — | 2 | 1 |
|---|---|---|---|---|
| 32 | 31 | — | 18 | 17 |
| \| | \| | — | \| | \| |
| 240 | 239 | — | 226 | 225 |
| 256 | 255 | — | 242 | 241 |

90° CLOCKWISE ROTATION

FIG.11(C)

| 241 | 242 | — | 255 | 256 |
|---|---|---|---|---|
| 225 | 226 | — | 239 | 240 |
| \| | \| | — | \| | \| |
| 17 | 18 | — | 31 | 32 |
| 1 | 2 | — | 15 | 16 |

90° COUNTERCLOCKWISE ROTATION

FIG.11(D)

| 256 | 240 | — | 32 | 16 |
|---|---|---|---|---|
| 255 | 239 | — | 31 | 15 |
| \| | \| | — | \| | \| |
| 242 | 226 | — | 15 | 2 |
| 241 | 225 | — | 17 | 1 |

180° ROTATION

FIG. 12(A)

| 241 | 225 | — | 17 | 1 |
|---|---|---|---|---|
| 242 | 226 | — | 18 | 2 |
| \| | \| | — | \| | \| |
| 255 | 239 | — | 31 | 15 |
| 256 | 240 | — | 32 | 16 |

NORMAL MIRROR

FIG. 12(B)

| 1 | 2 | — | 15 | 16 |
|---|---|---|---|---|
| 17 | 18 | — | 31 | 32 |
| \| | \| | — | \| | \| |
| 225 | 226 | — | 239 | 240 |
| 241 | 242 | — | 255 | 256 |

90° CLOCKWISE ROTATION MIRROR

FIG. 12(C)

| 256 | 255 | — | 242 | 243 |
|---|---|---|---|---|
| 240 | 239 | — | 226 | 225 |
| \| | \| | — | \| | \| |
| 32 | 31 | — | 18 | 17 |
| 16 | 15 | — | 2 | 1 |

90° COUNTERCLOCKWISE ROTATION MIRROR

FIG. 12(D)

| 16 | 32 | — | 240 | 256 |
|---|---|---|---|---|
| 15 | 31 | — | 239 | 255 |
| \| | \| | — | \| | \| |
| 2 | 18 | — | 226 | 242 |
| 1 | 17 | — | 225 | 241 |

180° ROTATION MIRROR

DIGITAL IMAGE PROCESSING APPARATUS

BACKGROUND OF THE INVENTION

1. Field of the Invention

The present invention relates to a digital image processing apparatus and more particularly to a digital image processing apparatus which has an electric zooming function for electrically magnifying and contracting a digital image signal, a function for a longitudinal-lateral conversion, and so forth.

2. Description of the Related Art

Conventionally, a method of electrically zooming is known wherein digital image signals in a predetermined region in one screen are read out from an image memory which stores the digital image signals for one screen, and wherein an interpolation operation is performed for the read-out digital image signals to generate the digital image signals for one screen, so that the screen can be electrically magnified and contracted.

And, when the interpolation in the horizontal line is carried out, the frequency characteristic in the vertical direction changes in accordance with the interpolation coefficient in the interpolation. There is an apparatus proposed which controls the gain of the vertical contour correction in accordance with the interpolation coefficient and keeps the acumination in the vertical direction of the image fixed (Japanese Patent Application Laid-open No. 4-157988).

Moreover, there is a digital image processing apparatus (Japanese Patent Application Laid-open No. 3-139773) which reads out a digital image signal of a small block from a first memory storing a digital image signal so as to store it in a second memory, and use the digital image signal stored in the second memory, thereby carrying out the digital image processing with a small block as a unit.

However, since sequent (periodical) digital image signals for one screen are processed in the conventional method of electric zooming, plural line memories are required when the interpolation operation is carried out, so the size of a circuit has to be large and the electric zoom processing and a special processing such as a vertical-lateral conversion, a contour correction and the like cannot be simultaneously carried out in a simple circuit. Incidentally, the digital image processing apparatus disclosed in Japanese Patent Application Laid-open No. 3-139773 carries out the digital image processing with a small block as a unit, but does not carry out the electric zoom processing, etc. And, in the apparatus disclosed in Japan Patent Application No. 4-157988, there is a problem in that a gain control is complicated due to the equalization of the acumination of the image in the vertical direction when the gain of the vertical contour correction is controlled in accordance with the interpolation coefficient.

SUMMARY OF THE INVENTION

The present invention has been developed in view of the above-described circumstances and has as its aim the provision of a digital image processing apparatus which can carry out the electric zoom processing and the special processing such as a longitudinal-lateral conversion of the image and the contour correction in a small-size circuit, can reduce an incongruity (central dislocation and a difference in resolution), and can carry out the contour correction in the vertical direction in a compact circuit.

To achieve the above-mentioned objects, the digital image processing apparatus according to the present invention is provided with a first memory which stores digital image signals for one screen, a first memory control means which divides digital image signals stored in the first memory into small blocks of m×n picture elements in which picture elements in the horizontal direction partially overlaps each other so as to read out digital image signals of each small block, a block memory which stores digital image signals of each small block which have been read out by the first memory control means, a digital image processing means which carries out the electric zoom processing and at least the interpolation operation for the digital image signals of each small block which are read out from the block memory, and a second memory which stores digital image signals which have been processed by the digital image processing means.

And, the first memory control means performs the longitudinal-lateral conversion and the right-left conversion of the image by changing the order to read out digital image signals from the first memory and the order to write the digital image signals in the block memory.

Furthermore, the digital image processing means has a contour correction means which carries out the contour correction of the digital image signals in the vertical direction, controls an interpolation coefficient to preventing the picture element at the center of a screen from being out of position at the time of electric zooming, and controls the interpolation coefficient to prevent the interpolation coefficient from being 0 or 1 at the time of electric zooming.

According to the present invention, the digital image signals of each small block of m×n picture elements are read out from the first memory which stores digital image signals for one screen, and storing them in the block memory, thereby carrying out the electric zoom processing together with the interpolation operation with a small block as a unit. Picture elements in a small block partially overlap picture elements in an adjacent small block, so that the interpolation processing in the horizontal direction can be carried out in the boundary of small blocks.

And, the first memory control means performs the longitudinal-lateral conversion and the right-left conversion of an image by changing the order to read out the digital image signals from the first memory and the order to write the digital image signals in the block memories. Moreover, the digital image processing means carries out the contour correction of the digital image signals in the vertical direction based on the digital image signals which have been zoom-processed in each small block unit, controls the interpolation coefficient to prevent the picture element at the center of the screen from being out of position at the time of electric zooming and controls the interpolation coefficient to prevent the interpolation coefficient from being 0 or 1 at the time of electric zooming, so that the acumination of an image can be uniform.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures and wherein:

FIGS. 11(A), 11(B), 11(C) and 11(D) are views showing the order to write the data in the block memory in accordance with the condition of each original image;

FIGS. 12(A), 12(B), 12(C) and 12(D) are views explaining the order to write the data in the block memory in accordance with the condition of each original image;

DESCRIPTION OF THE PREFERRED EMBODIMENT

Detailed description will hereunder be given of the preferred embodiment of a digital image processing apparatus according to the present invention with reference to the accompanying drawings.

Figure 1:
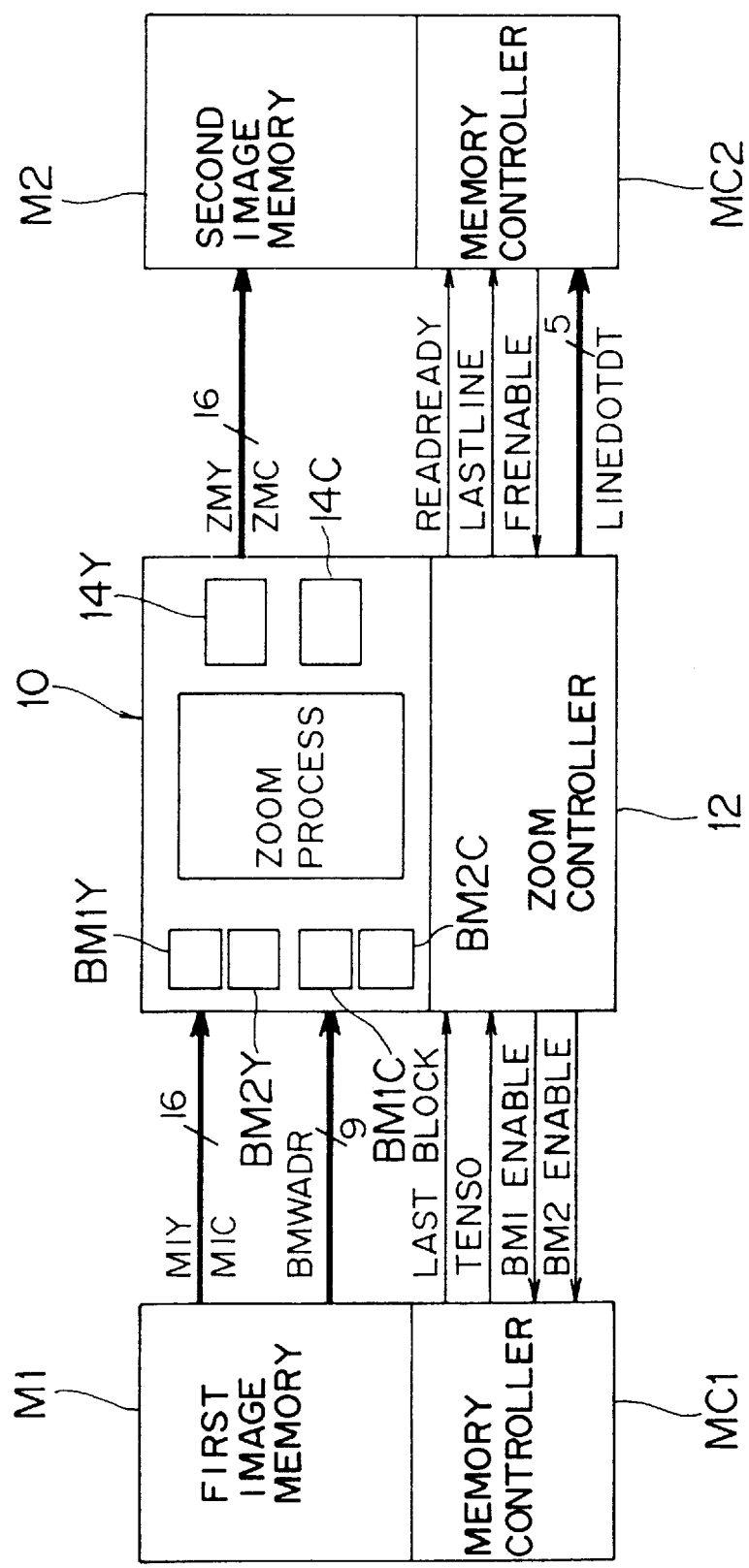
FIG. 1 is a block diagram showing one embodiment of the digital image processing apparatus according to the present invention.

FIG. 1 is a block diagram illustrating one embodiment of a digital processing apparatus according to the present invention. The digital processing apparatus is used for a film scanner, which obtains an image signal indicating a film image by scanning a negative film with a CCD line sensor for example, and mainly comprises a first image memory M1, a second image memory M2, a zoom block 10, memory controllers MC1 and MC2 which control the first image memory M1, the second image memory M2 and a zoom controller 12 which controls the zoom block 10.

Figures 2, 3:
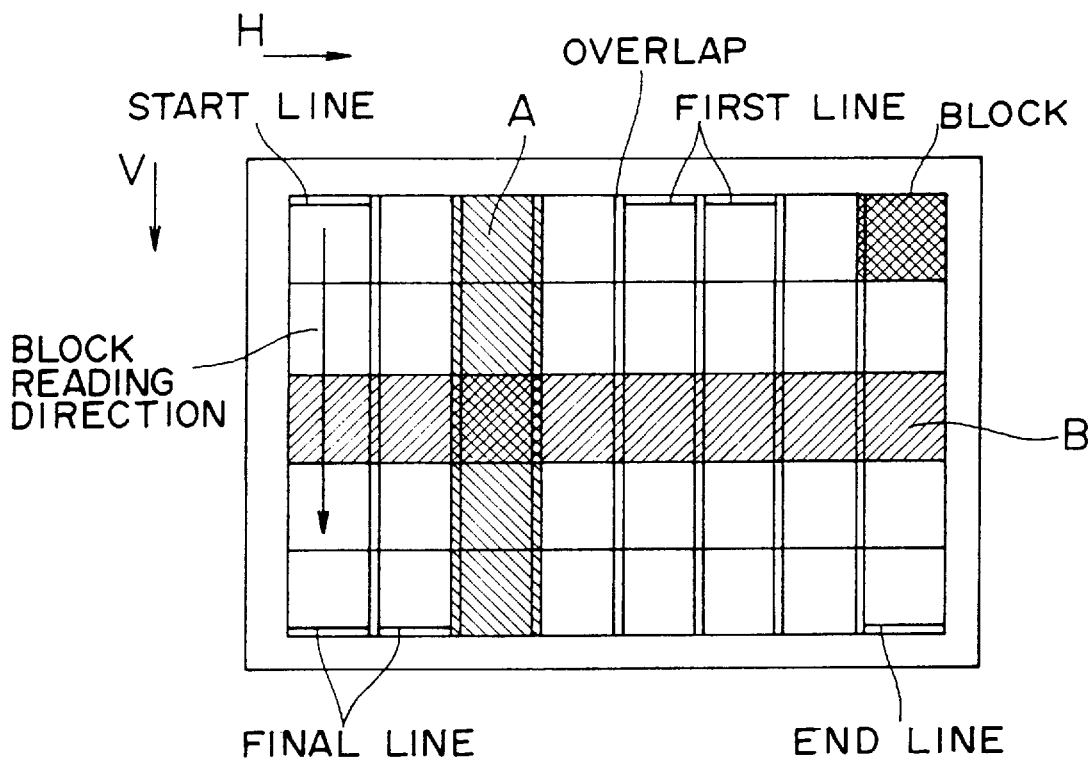
FIG. 2 is a view explaining the order of the transfer of the digital image signals in each small block from the first image memory.
FIG. 3 is a view explaining the dot-sequential order of chroma signals stored in the first image memory.

In the first image memory M1, a digital image signal (a luminance signal + a chroma signal) for one screen, which is obtained by scanning the negative film with the CCD line sensor, is stored. The luminance signal and the chroma signal are stored with a gradation of 8 bit per picture element, and as for the chroma signal, a signal $C_b$ and a signal $C_r$ are alternately stored in reverse order in an odd number line and an even number line as shown in FIG. 3. That is, in the odd number line, they are stored in the order $C_b, C_r, C_b, C_r, \ldots$, and they are stored in the order $C_r, C_b, C_r, C_b, \ldots$ in the even number line. The zoom block 10 has an electric zooming function which changes the number of the picture elements in the digital image signals of the small block of 16×16 picture elements which is transferred from the first image memory M1, and a function which performs a contour correction in a vertical direction (in this case, the direction of a line of a TV, etc.). A zooming magnification can be sequentially changed in the range from ¼ (contraction) to 2 (magnification). And, the zoom block 10 has four block memories BM1Y, BM2Y, BM1C, and BM2C, and a luminance signal of 16×16 picture elements is stored in each of the block memories BM1Y and BM2Y, a chroma signal of 16×16 picture elements is stored in each of the block memories BM1C and BM2C.

The zoom block 10 receives the digital image signal from the first image memory M1, and outputs the digital image signal which has been zoom-processed to the second image memory M2. Because the first image memory M1 and the second image memory M2 and the zoom block 10 work ashynchronously, the zoom block 10 delivers the data in each image memory by handshaking.

That is, when the block memories BM1Y and BM1C in the zoom block are empty (at the time when the data processing in these block memories is over), the zoom controller 12 brings the BM1ENABLE signal (negative logic) in an enable state (L level). The memory controller MC1 starts transferring the luminance signal and the chroma signal in a small block unit for the empty block memories BM1Y and BM1C, and at the same time, brings a TENSO signal in a disable state (H level). The zoom controller 12 detects from the TENSO signal that the transfer starts, and brings the BM1ENABLE signal in a disable state because the block memories BM1Y and BM1C are used (in transfer). After that, when the transfer is over, the memory controller MC1 the TENSO signal in a disable state.

After the zoom processing in the block memories BM2Y and BM2C is completed, the zoom controller 12 immediately starts processing the data in the block memories BM1Y and BM1C when the data transfer to the block memories BM1Y and BM1C is over. On the contrary, in the case that the zoom processing is late but the transfer has been completed, the memory controller has to wait until the BM2EVABLE signal is in the enable condition. Incidentally, the block memories BM1Y, BM2Y, BM1C and BM2C are preferable to be a static random access memory (SRAM), but the first image memory M1 and the second image memory M2 can correspond to all kinds, and a dynamic random access memory (DRAM), of which accessing method is under many restrictions, can control at a high speed.

Now, FIG. 2 shows the transfer order of the signals of each block from the first image memory when the image is on the standard (erecting image, horizontal image, non mirror image) when seen from the zoom block 10. That is, in FIG. 2, the digital image signals of each small block are transferred from a block at the upper left in the downward direction (in the direction of V), and when the transfer of a block set A in one vertical line is over, the block set positioned at the right of the block A is transferred from the upper small block to a lower small block.

And, as shown in FIG. 2, the blocks in a block set B in a horizontal direction are divided in such a manner that the part (two picture elements) of the picture elements overlap each other. The purpose of that is to secure sequentially in the horizontal direction for a first interpolation of picture elements in the horizontal direction. Incidentally, the data in the vertical direction in each block is continuous, and the data proceeding one line can be kept by using a line memory in the zoom block 10, so there is no need for the overlap reading in the horizontal direction.

The zoom controller 12 needs to detect the delimiters between the blocks in the vertical direction, and this detection is performed by the memory controller MC1 which brings a LASTBLOCK signal into an enable condition during the transfer of the last line in the block set in the vertical direction. And, when the block memories BM1Y, BM1C, BM2Y and BM2C are empty and the TENSO signal is in a disable condition, the zoom controller 12 recognizes the completion of the transfer of signals in one screen.

The luminance signal and the chroma signal, which have been processed by the zoom block 10, are respectively inputted to a FIFO memories 14Y and 14C. And, when the data is stored in the FIFO memories 14Y and 14C and reading-out is possible, the zoom controller 12 brings a READREADY signal in an enable condition(L level). And, the information on the number of effective picture elements in one line is transmitted to the memory controller MC2 by a LINEDOTDT signal (5 bit). The memory controller MC2 brings a FRENABLE signal into an enable condition after the writing in the second image memory M2 is ready. Therefore, the zoom controller 12 sweeps out the data in the FIFO memories 14Y and 14C with a clock rate which corresponds to the second image memory M2 until the FIFO memories 14Y and 14C is empty while a FRENABLE signal is in an enable condition, or until a FRENABLE signal is in a disable condition.

Next, an explanation will be given of the zoom block 10.

Figure 4:
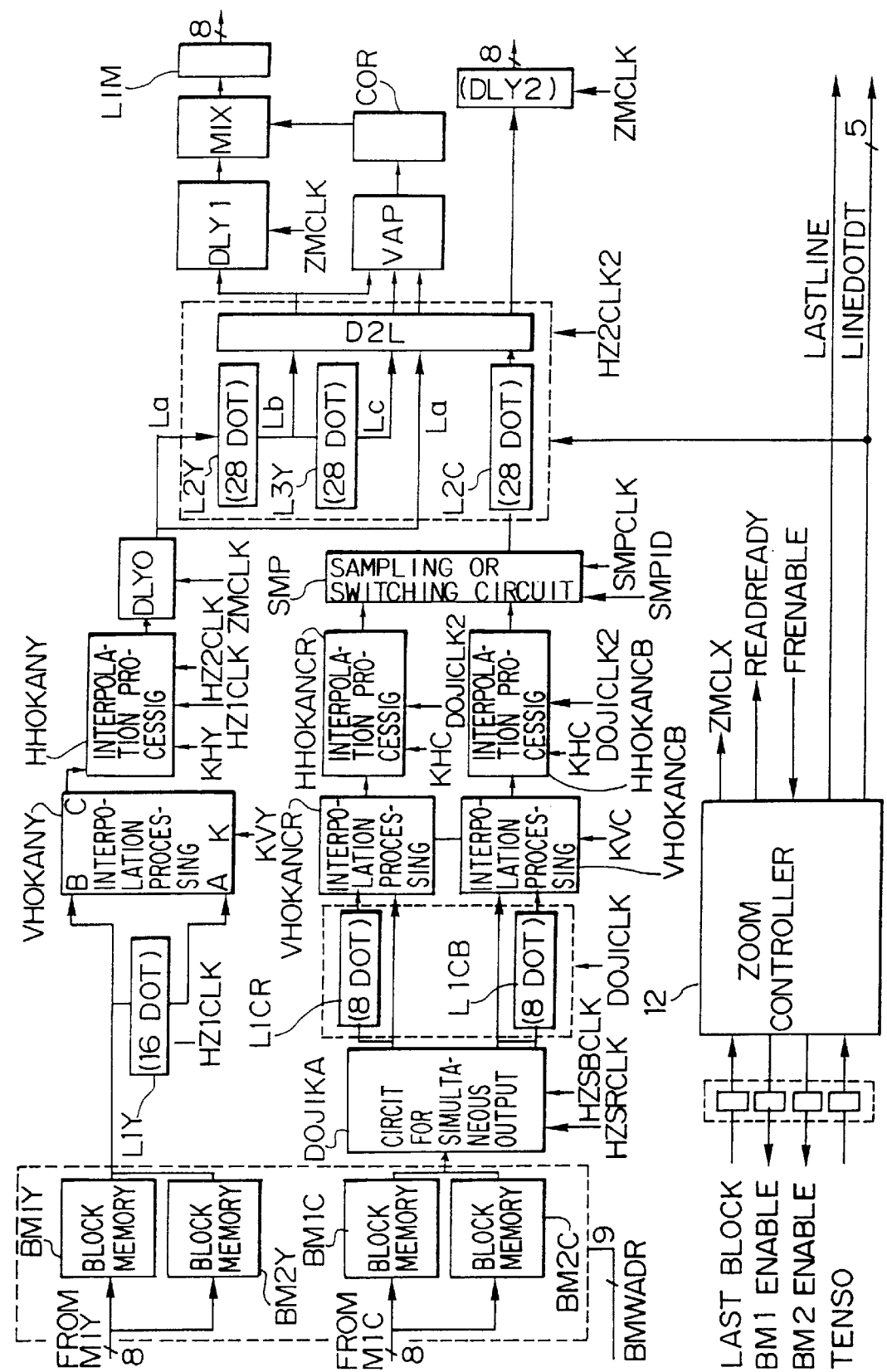
FIG. 4 is a block diagram showing the details of a zoom block of FIG. 1.
Figure 5:
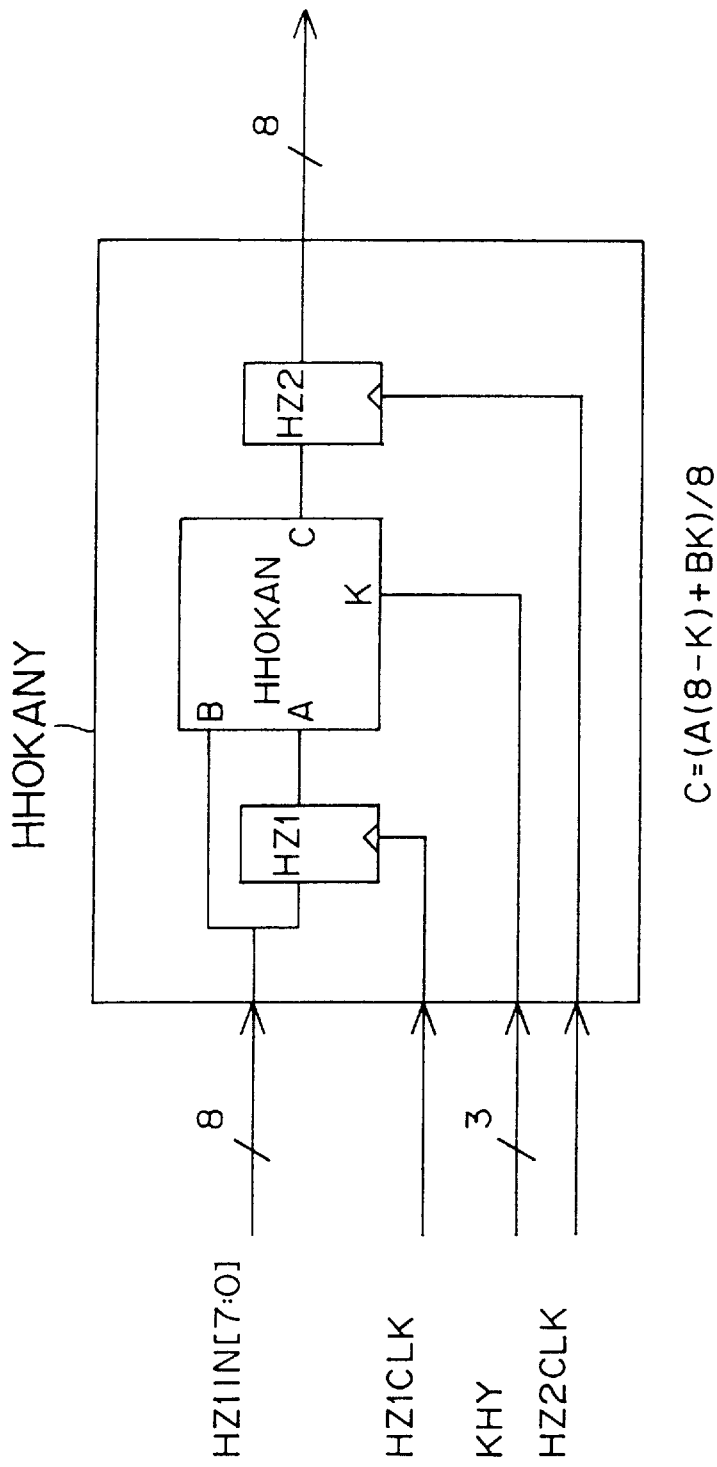
FIG. 5 is a view showing one example of an interpolation processing circuit which carries out a first linear interpolation operation in the horizontal direction of the luminance system of FIG. 4.
Figure 6:
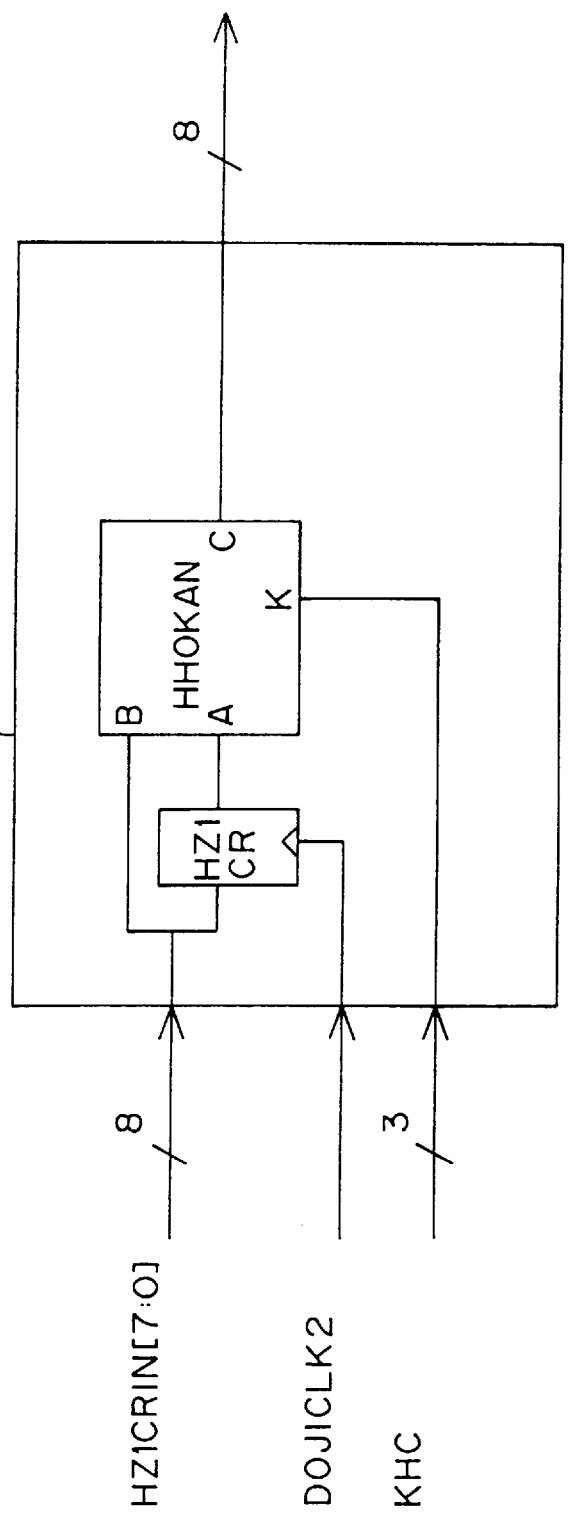
FIG. 6 is a view showing one example of the interpolation processing circuit which carries out a first linear interpolation operation in the horizontal direction of chroma system of FIG. 4.

FIG. 4 is a block diagram illustrating the details of the zoom block 10. In FIG. 4, block memories BM1Y and BM2Y for luminous system and block memories BM1C and BM2C for chroma system are accessed by means of double buffer method. For instance, when the zoom controller 12 accesses the block memories BM1Y and BM1C, the memory controller MC1 accesses the block memories BM2Y and BM2C. Incidentally, as described previously, a handshaking is carried out between the memory controller MC1 and the zoom controller 12, so that the data can be transmitted between the first image memory M1 and the block memories BM1Y, BM2Y, BM1C and BM2C. Incidentally, the memory controller MC1 is in charge of the writing in the block memories BM1Y, BM2Y, BM1C and BM2C, and the zoom controller 12 is in charge of the reading.

First, an explanation will be given of the digital image processing of the luminance system.

A luminance signal (8 bit), which is read out from the block memory BM1Y or BM2Y, is inputted directly to an interpolation processing circuit VHOKANY, and inputted directly to the interpolation processing circuit VHOKANY via a line memory L1Y of 16 picture elements×8 bit. Incidentally, a HZ1CLK signal is added to a line memory L1Y and the like. The detail explanation on it will be given later.

The interpolation processing circuit VHOKANY performs a first linear interpolation operation, and obtains a luminance signal C, which has been interpolated in the vertical direction, by carrying out the following calculation when the luminance signal inputted from the block memories BM1Y/BM2Y is B, the luminance signal proceeding one line against the signal B, which is delayed due to the line memory L1Y, is A, and the value of an interpolation coefficient KVY (3 bit) is K (0–7);

$$C=\{A(8-K)+BK\}/8 \quad (1)$$

How to set the interpolation coefficient KVY will be explained later.

And, the change of the number of the picture elements in the vertical direction is carried out by controlling a vertical address of the block memories BM1Y/BM2Y and overlap reading at the time of magnification. On the other hand, at the time of contraction, the data is read out in the same order as when the magnification is 1, and this operation is performed by selecting the data in the D flip-flop in an interpolation processing circuit HHOKANY, which will be explained later.

The luminance signal C, which has been interpolated in the interpolation processing circuit VHOKANY, is added to the interpolation processing circuit HHOKANY in the horizontal direction. The interpolation processing circuit HHOKANY carries out the first linear interpolation operation in the horizontal direction and the like, and has D flip-flops HZ1 and HZ2 and an interpolation operation part HHOKAN. The D flip-flop HZ1 is driven by the HZ1CLK signal, and keeps the data proceeding one picture element. The interpolation operation part HHOKAN calculates the luminance signal C, which has been interpolated in the horizontal direction, by carrying out the same calculation as (1) where the luminance signal inputted from the interpolation processing circuit VHOKANY is B, the luminance signal proceeding one picture element, which is delayed due to the D flip-flop HZ1 is A, and the value of the interpolation coefficient KHY (3 bit) received from the zoom controller 12 is K (0–7). The conversion of the number of the picture elements in the horizontal direction is performed by thinning out the HZ1CLK signal which drives the D flip-flop HZ1 (line memory L1Y) at the time of magnification, controlling a horizontal address of the block memories BM1Y/BM2Y, and duplicate reading. On the other hand, at the time of contraction, the data is consecutively outputted in the same way as when the magnification is 1, and the data is selected (thinned out) in the D flip-flop HZ2 driven by the HZ2CLK signal. For example, at the time of contracting at a rate of 0.5, the fourteen data are inputted in the same order as when the magnification is 1, and the seven data are selected in the D flip-flop HZ2 to be outputted. Incidentally, two picture elements of the sixteen data are overlapped data, so the fourteen data are outputted when the magnification is 1.

The luminance signal outputted from the interpolation processing circuit HHOKANY is inputted indirectly to a V aperture producing circuit VAP via a delay circuit DLYO for equalizing the phase of the luminous signal and the chroma signal, and is delayed for one line and two lines by line memories L2Y and L3Y before being imputted to the V aperture producing circuit VAP. Incidentally, the line memories L2Y and L3Y have the length of 28 picture elements (the length at the time when the magnification is 2) so as to correspond to the increase and decrease of the picture elements, and is address-controlled so that the number of the picture elements in one line can be variable. And, the number of the picture elements in one line is detected by the LINEDOTDT signal (5 bit) outputted from the zoom controller 12.

The V aperture signal producing circuit VAP calculates the V aperture signal $V_{ap}$ with the following equation if the luminance signal outputted from the delay circuit DLYO is $L_a$, the luminance signal outputted from the line memory L2Y is $L_b$, and the luminance signal outputted from the line memory L3Y is $L_c$;

$$V_{ap}=\{L_b-(L_a+L_c)\cdot\tfrac{1}{2}\} \text{ VAPGAIN} \quad (2)$$

Incidentally, VAPGAIN means the aperture gain, and is initialized by a CPU.

The aperture signal $V_{ap}$ outputted from the V aperture signal producing circuit VAP is inputted to a mix circuit MIX after its micro signal which causes the noise is eliminated by a circuit COR. The luminance signal $L_b$ is also inputted to the mix circuit MIX via the delay circuit. The mix circuit MIX outputs a sum of the luminance signal to $L_b$ and the V aperture signal. Incidentally, the delay circuit DLY1 equalizes the phase of the luminance signal of the main line and that of the final V aperture signal which passes through the circuit COR, and it is not necessary in the case that there is no difference in phase between the two signals.

A limiter LIM is a circuit for preventing the amplitude of the luminance signal to which the V aperture signal is added from exceeding the positive 8 bit, and more particularly, for preventing the luminance signal to which the negative V aperture is added from being negative.

Next, an explanation will be given of the digital image processing of chroma system.

The chroma signals $C_r$ and $C_b$ (8 bit) which are read out from the block memory BM1C or BM2C are inputted to a simultaneous circuit DOJIKA. The circuit DOJIKA also receives HZSRCLK/HZSBCLK signals which latches the chroma signals $C_r$ and $C_b$ with the input timing of the chroma signals, and the simultaneous circuit DOJIKA latches the chroma signals $C_r$ and $C_b$ with the HZSRCLK/HZSBCLK signals and simultaneously outputs them. The chroma signal $C_r$ outputted from the simultaneous circuit DOJIKA is inputted to the interpolation processing circuit VHOKANCR, and indirectly inputted to the interpolation processing circuit VHOKANCR via the line memory L1CR of 8 picture elements×8 bit. Incidentally, the DOJICLK signal inputted to the line memory L1CR and the like is a signal, which is outputted from the zoom controller 12 when the next picture element is read out, and a signal which is picked out from the signal having a later phase in the HZSRCLK and the HZSBCLK. And, respective signal rate of the chroma signals $C_r$ and $C_b$ is half the luminance signal Y.

The interpolation processing circuit VHOKANCR in the vertical direction performs the primary linear interpolation operation in the same way as the interpolation processing circuit VHOKANY in the vertical direction for the luminance signal, and outputs the interpolated chroma signals $C_r$ and $C_b$ to the interpolation processing circuit HHOKANCR.

The interpolation processing circuit HHOKANCR performs the primary linear interpolation operation in the horizontal direction, and has the D flip-flop HZ1CR and the interpolation operation part HHOKAN. The D flip-flop HZ1CR is driven by the DOJICLK2 signal, and keeps the data which proceeds one picture element. The interpolation operation part HHOKAN calculates the interpolated chroma signal $C_r$ by carrying out the same operation as above-mentioned (1) where the chroma signal inputted from the interpolation processing circuit VHOKANCR is B, the chroma signal proceeding one picture element, which is delayed by the D flip-flop HZ1CR, and the value of the interpolation coefficient KHC (3 bit) received from the zoom controller 12 is K (0~7).

Similarly, the chroma signal $C_b$ outputted from the circuit DOJIKA is inputted to the interpolation processing circuit VHOKANCB in the vertical direction, and inputted to the interpolation processing circuit VHOKANCB via the line memory of 8 picture elements×8 bit. Incidentally, the interpolation processing circuit VHOKANCB in the vertical direction and the interpolation processing circuit HHOKANCB is a circuit similar to the previously-mentioned interpolation processing circuit VHOKANCR and the interpolation processing circuit of HHOKANCR of the chroma signal $C_r$, so the detailed explanation on it is omitted here.

A sampling circuit SMP arranges the chroma signals $C_r$ and $C_b$, which have been simultaneously outputted and respectively interpolated in normal dot-sequential order, and thins out the data at the time of contraction. And, the circuit SMP simultaneously latches (sampling) the chroma signals, which have been simultaneously outputted and zoom-processed by a SMPCLK signal inputted from the zoom controller 12, and outputs them in the normal order $C_r$ and $C_b$. However, there is a case that the number of picture elements in one line is an odd number and an even number because of the zoom processing, so the outputting order is $C_b$ and $C_r$ when the number of picture elements in one line of the previous block in the horizontal direction is an odd number. Incidentally, the zoom controller 12 memorizes whether the number of picture elements in one line of the previous block is an odd number or an even number, and it outputs a SMPID signal of H level in the case of the even number and outputs a SMPID signal of L level in the case of the odd number. And, the number of picture elements in the horizontal direction is changed by thinning out the DOJICLK2 signal which drives the D flip-flop HZ1CR/HZ1CB and controlling the horizontal address of the block memories BM1C/BM2C, and performing the overlap reading when the magnification is carried out.

On the other hand, the data is outputted in the same order as when the magnification is 1, and the circuit SMP thins out the data at the time of contraction. The dot-sequential chroma signals outputted from the sampling circuit SMP has a length of 28 picture elements which are provided to equalize the phase of the chroma signal and the luminance system, and are outputted to the delay circuit DLY2 via the line memory L2C, which can increase and decrease the length of one line, in the same way as the luminance signal Y. Incidentally, the line memory L2C and the line memories L2Y and L3Y of luminance system are operated with the same timing, has the length of 28 picture elements and uses a dual port memory of which depth is 24 bit. The delay circuit DLY2 equalizes the phase of the final output of the luminance signal and the chroma signal, and it is not required if there is not difference in phase between two signals.

Figure 7:
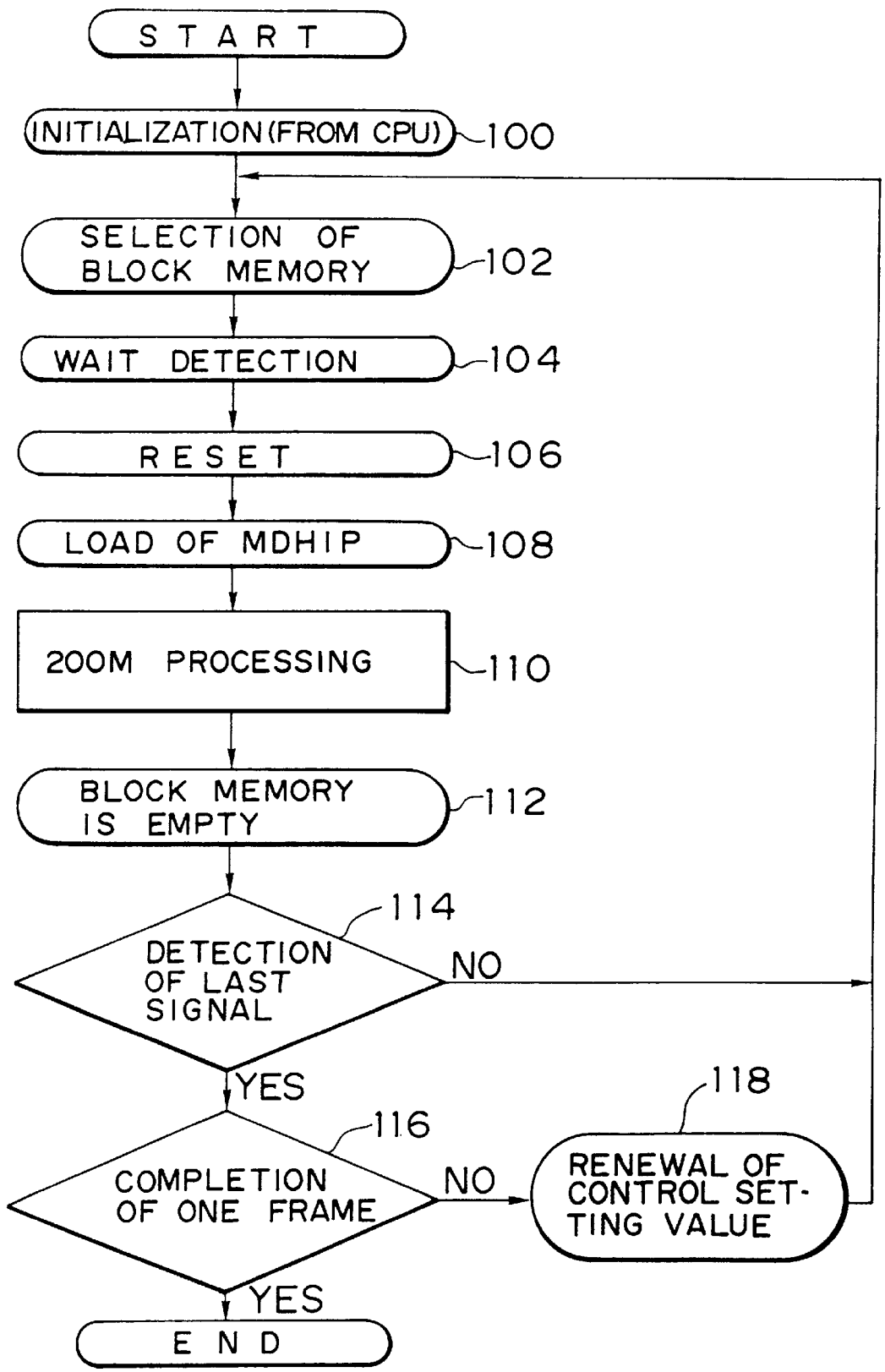
FIG. 7 is a flow chart showing the electric zoom processing according to the present invention.

Next, an explanation will be given of the electric zoom processing with reference to a flow chart in FIG. 7.

First, initial values in the following table are set by a central processing apparatus (CPU), which is not shown in the drawing.

[TABLE 1]

| Register | Names in the zoom block | The number of bit |
|---|---|---|
| MAGH | MDH | 10 |
| MAGV | MDV | 10 |
| VAPGAIN | VAPGAIN | 6 |
| CORELEVEL | CORELEVEL | 4 |
| FSETUPH | MDHIP | 11 (3 + 8) |
| FSETUPV | MDV1 | 11 (3 + 8) |

The data showing an interval of picture elements in the horizontal and vertical direction is set in the MDH and MDV, and for example, when the interval of picture elements is 256 in the case when the magnification is 1, the data is set in 10 bit according to the zoom magnification. The VAPGAIN is a quantity of gain which is multiplied in the V aperture signal producing circuit VAP, and the CORELEVEL is a threshold level set for eliminating micro signals in a circuit COR. And, the FSETUPH and the FSETUPV are the values indicating the first position of a picture element in the horizontal direction and the vertical direction respectively.

Next, the block memory for use is determined (step 102). The processing starts in the block memories BM1Y and BM1C, and after that, the block memories BM2Y and BM2C and the block memories BM1Y and BM1C are alternately changed for use, in accordance with the condition of each signal line of BM1ENABLE signal/BM2ENABLE signal/TENSO signal.

Next, a WAIT signal is detected (step 104), and when the waiting condition is released by the WAIT signal, and the operation proceeds to the next step 106. Incidentally, the WAIT signal is outputted when the FIFO memories 14Y and 14C are full or the data transfer from the first image memory M1 to the block memory is late. When the WAIT signal is outputted, the signal processing operation stops working.

In the step 106, after the processing of one block memory is completed, a RESET signal, which is outputted when a waiting situation for the zoom processing is released, is detected, and in a step 108, MDHIP (representing the position of the first pixel of a small block) is loaded by the RESET signal. Incidentally, in the first block set, FSETUPH which has been initialized is set as MDHIP as shown in the table 1, therefore the initialized FSETUPH is loaded. The MDHIP is renewed when the processing starts in the next block is renewed when the processing for the next block set is started as described later, the renewed value is loaded from the next time. Furthermore, the MDVI is returned to an initial value every time the processing moves to the next block.

Next, the zoom processing is carried out based on MDH, MDV, MDHIP, and MDVI, which are initialized in the table 1 (step 110). For example, in the case when the interpolation operation in the horizontal direction is carried out, MDHI (representing the distance between the original pixel and a newly created pixel) is calculated with the following equation;

$$MDHI=MDH+MDHI(L) \qquad (3)$$

In this equation, MDH is the data of 10 bit indicating the interval of picture elements in the horizontal direction, and MDHI(L) is the data of lower 8 bit among MDHI of 11 bit.

Figure 8:
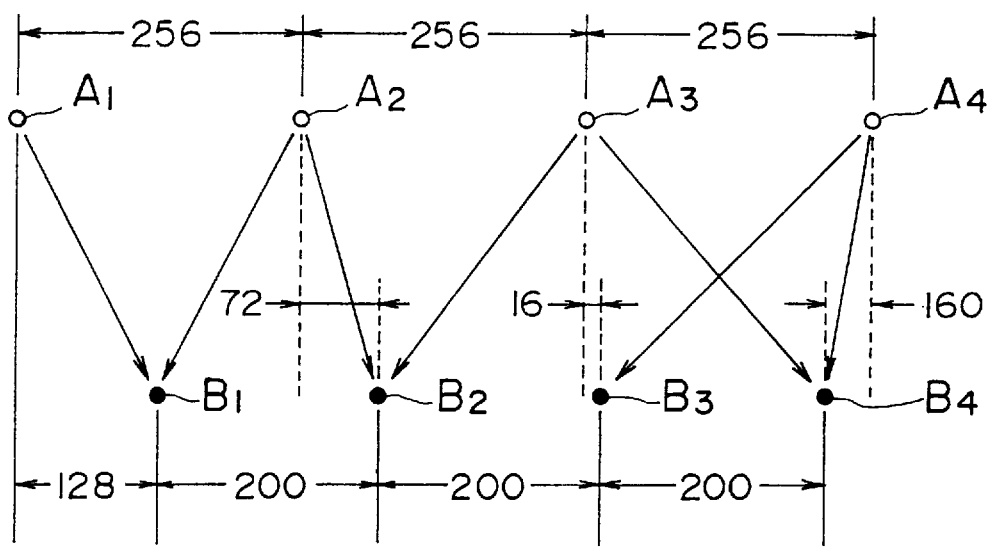
FIG. 8 is a view explaining the zoom processing of FIG. 7.

Now, the data on picture elements is $A_1$, $A_2$, $A_3$, $A_4$. . . when the magnification is 1 as shown in FIG. 8, the interval of picture elements is 256, the data on picture elements is $B_1$, $B_2$, $B_3$, $B_4$ . . . , the interval of picture elements is 200, and $B_1$ is on the right side of $A_1$ and 128 away from $A_1$. In this case, $B_1$ is calculated with the interpolation coefficient K corresponding to $A_1$, $A_2$ and 128 as shown in the equation (1). Next, when the $B_2$ is calculated, MDHI is obtained by the above-mentioned equation (3). In this case, because MDH is 200 and MDHI(L) is 128, MDHI is 328. The MDHI is more than 256, and a carrier element (MDHI (U) which is upper 3 bit of MDHI) is 1, so the HZ1CLK signal shown in FIG. 4 is outputted and the next picture element is read out, and as a result, $B_2$ is calculated by the interpolation operation of $A_2$ and $A_3$. And, MDHI(L)=72, the interpolation coefficient K corresponding to 72 is set. Similarly, when $B_3$ is calculated, MDHI=200+72=272 is found from the above-mentioned equation (3). Because MDHI(U)=1 and MDHI (L)=16, the HZ1CLK signal is outputted and the next picture element is read out, and $B_3$ is calculated by the interpolation coefficient K corresponding to $A_3$, $A_4$ and 16. Then, when the $B_4$ is calculated, MDHI=200+16=216 is found from the above-mentioned equation (3). Because MDHI(U)=0 and MDHI(L)=216, the HZ1CLK signal is not outputted, and $B_4$ is outputted by the interpolation coefficient K corresponding to $A_3$, $A_4$ and 216. In this way, when 15 HZ1CLK signals are outputted, the processing of one line is over, so MDHIP is loaded with MDHI, so that the interpolation operation of the next line can be carried out. Incidentally, the interpolation operation in the vertical direction is carried out in the same way.

When the zoom processing for one block is completed in the above-mentioned way, it is transmitted to the memory controller MC1 that the use of the block memory is finished (the block memory becomes empty) (step 112). That is, a BM×ENABLE signal of the block memory which is used is in an enable condition.

Next, it is detected whether or not there is the LAST signal (whether H level or not) (step 114). The LAST signal is a signal indicating the last block of the block set, returns to the step 102 when the LAST signal is not detected, and detects whether one frame is finished or not when the LAST signal is detected (step 116). Incidentally, the completion of one frame is detected when both BM1ENABLE signal and BM2ENABLE signal are in an enable condition with the TENSO signal being L level.

In the case that the one frame has not been completed yet, the control setting value is renewed in the step 118 and then the operation proceeds to the step 102 so as to start processing in the next block set. That is, the present MDHI is latched to be MDHIP, and the SMPID signal is L level when the number of picture elements in one line after being zoom-processed is the odd number, and the SMPID signal is H level when the number of picture elements is the even number, and MDVI is returned to be the initial value.

In this way, the digital image signals for one screen which are stored in the first image memory M1 are zoom-processed and contour-corrected by the zoom block 10, and then are stored in the second image memory M2. And, the digital image signals stored in the second image memory M2 are repeatedly read out. And, the read-out signals are transformed into analog image signals by a D/A transformer which is not shown in the drawing, then transformed into composite video signals of NTSC system by an encoder, and then are outputted to a monitor TV. As a result, it is possible to watch a film image with the monitor TV.

Next, an explanation will be given of the case when the longitudinal-lateral conversion is performed.

The digital image signals for one screen which are stored in the first image memory M1 are image signals which are obtained by scanning one frame of a negative film with a CCD line sensor, so in the case that the frame of the negative film is a longitudinal image, the image has to be rotated by ±90 when stored in the second image memory M2, so that the image can be erected on the monitor TV.

In the case of the digital image processing apparatus according to the present invention, the order to read out the digital image signals of each block from the first image memory M1 and the order to write the digital image signals in the block memory are changed so that the longitudinal-lateral conversion and the right-left conversion of the image can be carried out. Incidentally, the right-left conversion means that an original image is converted into a mirror image.

In the case when the original image is in a standard condition (erecting image, horizontal image, non mirror image) as shown in FIG. 9, as for the transfer of the digital image signals of each small block from the first image memory M1, the transfer starts from an upper left block and each block is transferred in the downward direction, and after all the blocks of one line in the vertical direction are transferred, the transfer starts again in a top block in the next block set on the right side and each small block is transferred in the downward direction. Then, when the transfer of a lower right block is over, the transfer of one frame is finished.

Figure 9A:
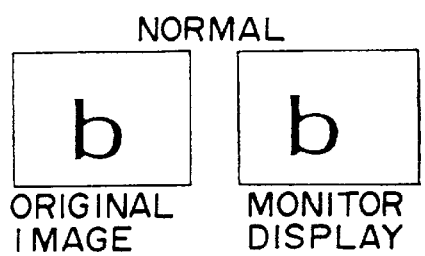
FIGS. 9(A), 9(B), 9(C) and 9(D) are views showing the order of the transfer of every small block from the first memory in accordance with the condition of each original image.
Figure 9B:
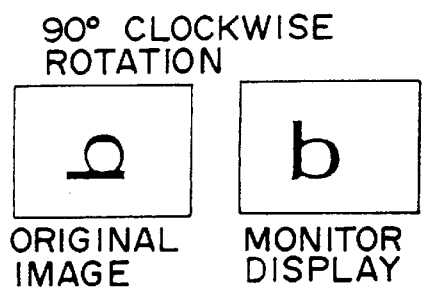

Next, an explanation will be given of the case that the original image is rotated clockwise by 90° when displayed on the monitor as shown in FIG. 9(B). In this case, the transfer starts from a lower left block and each block is transferred in the right direction, and when the block set of one line in the horizontal direction is over, the transfer starts again from the left-end block of the upper block set and each block is transferred in the right direction.

Figure 9C:
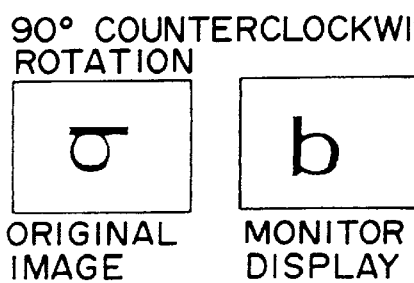

Similarly, in the case that the original image is rotated counterclockwise by 90° when displayed on the monitor as shown in FIG. 9(C), the transfer starts from the upper right block and each block is transferred in the left direction, and when the transfer of the block set of one line in the horizontal direction is over, the transfer starts again from a right-end block of the lower block set and each block is transferred in the left direction.

Figure 9D:
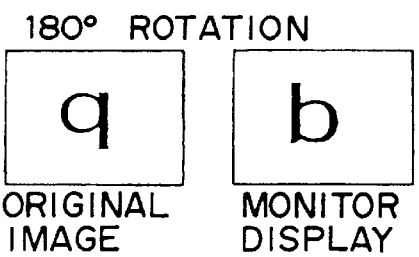

And, in the case that the original image is rotated by 180° when displayed on the monitor as shown in FIG. 9(D), the transfer starts from a lower right block and each block is transferred in the upward direction, and when the block set of one line in the vertical direction is over, the transfer starts again from the bottom block of the next left-side block set and each block is transferred in the upward direction.

Figure 10A:
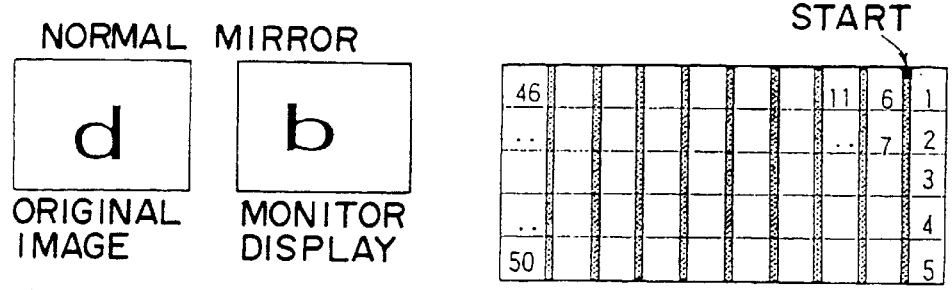
FIGS. 10(A), 10(B), 10(C) and 10(D) are views showing the order of the transfer of every small block from the first image memory in accordance with each original image.

On the other hand, in the case that the right-left conversion of the original image is performed (mirror image) when displayed on the monitor as shown in FIG. 10(A), the transfer starts from the upper right block and each block is transferred in the downward direction, and when the transfer of the block set of one line in the vertical direction is over, the transfer starts again from the top block of the next left-side block set and each block is transferred in the downward direction.

Figure 10B:
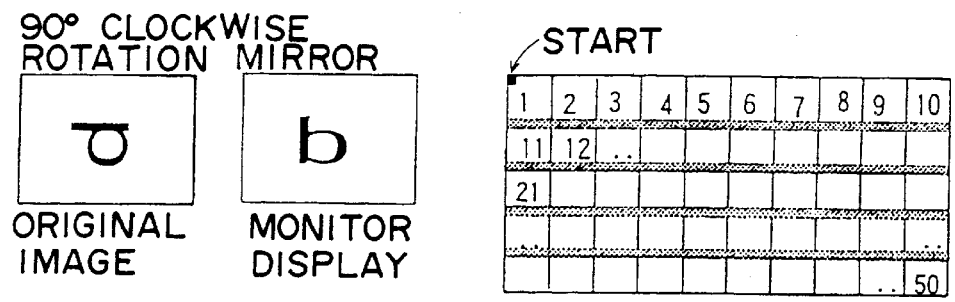

Next, in the case that the original image is rotated clockwise by 90° and the right-left conversion of it is carried out as shown in FIG. 10(B) when displayed on the monitor, the transfer starts from the upper left block and each block is transferred in the right direction, and when the transfer of the block set of one line in the horizontal direction is over, the transfer starts again from the left end block of the next lower block set and each block is transferred in the right direction.

Figure 10C:
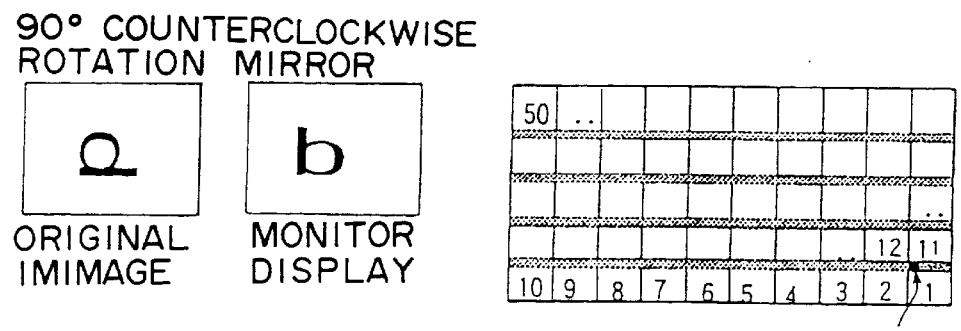

And, in the case that the original image is rotated counterclockwise by 90° and the right-left conversion is carried out as shown in FIG. 10(C), the transfer starts from the lower right block and each block is transferred in the left direction, and when the transfer of the block set of one line in the horizontal direction is over, the transfer starts from the right-end block of the next upper block set and each block is transferred in the left direction.

Figure 10D:
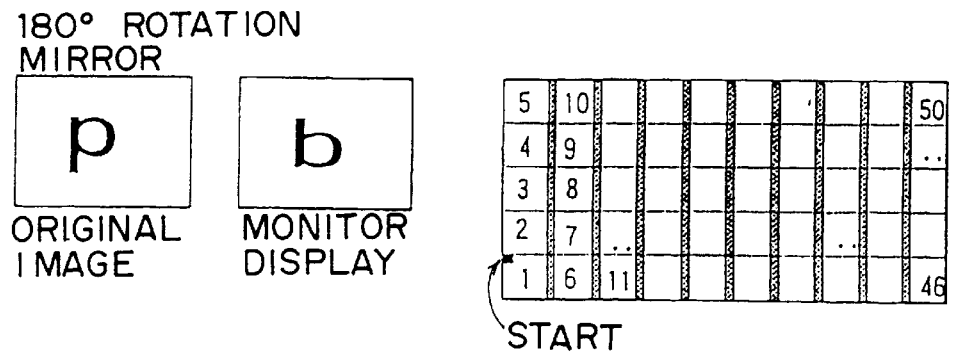

Furthermore, in the case that the original image is rotated by 180° and the right-left conversion of it is carried out as shown in FIG. 10(D) when displayed on the monitor, the transfer starts from the lower left block and each block is transferred in the upward direction, and when the transfer of the block set of one line in the vertical direction is over, the transfer starts again from the bottom block of the next right-side block set and each block is transferred in the upward direction.

The digital image signals in each block (16×16 picture elements) which have been transferred from the first image memory M1 in the transfer order shown in FIGS. 9(A), 9(B), 9(C) and 9(D) are respectively written in the block memory in the order shown in FIGS. 11(A), 11(B), 11(C) and 11(D). Similarly, the digital image signals in each block which have been transferred from the first image memory M1 in the order shown in FIGS. 10(A), 10(B), 10(C) and 10(D) are respectively written in the block memory in the order shown in FIGS. 12(A), 12(B), 12(C) and 12(D).

Incidentally, in the case that the image is rotated by ±90° as shown in FIGS. 9(B) and 9(C) and FIGS. 10(B) and 10(C), blocks are transferred from the first image memory M1 in the horizontal direction, and in this case, the block sets which are neighboring each other in the vertical direction are read out in such a manner that two picture elements overlap each other. And, as shown in FIG. 3, the chroma signals $C_b$ and $C_r$ are alternately stored and the order of them is reverse in the odd number line and the even number line, so even if the reading direction is changed when the longitudinal-lateral conversion is performed, the dot-sequential chroma signals can be obtained.

And, the zoom magnification can be sequentially changed from ¼ to 2 by the zoom order of a zoom button which is not shown in the drawing, but there is a problem mentioned below when the zoom magnification sequentially changes.

That is, the interval of picture elements sequentially changes in this case, the position of a picture element at the center of an original screen is out of the position of a picture element at the center of a screen calculated by the interpolation operation, and there is an incongruity (central dislocation) at the time of zooming.

Figure 13A:
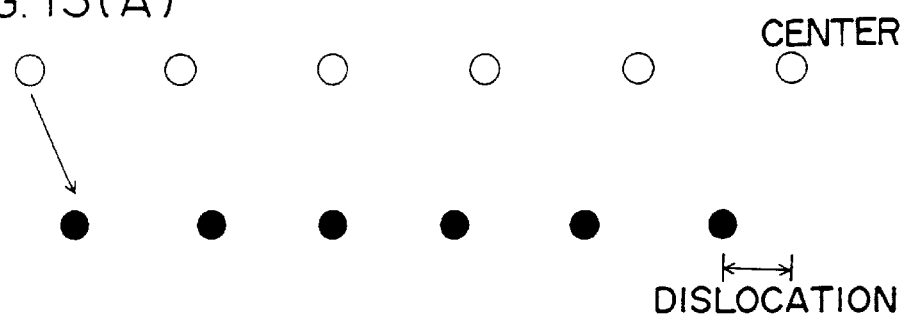
FIGS. 13(A) and 13(B) are views explaining the control of the interpolation coefficient for correcting the dislocation of the picture element at the center of the screen; and, FIG. 14(A) and 14(B) are views explaining the control of the interpolation coefficient for equalizing the acumination of the screen.
Figure 13B:
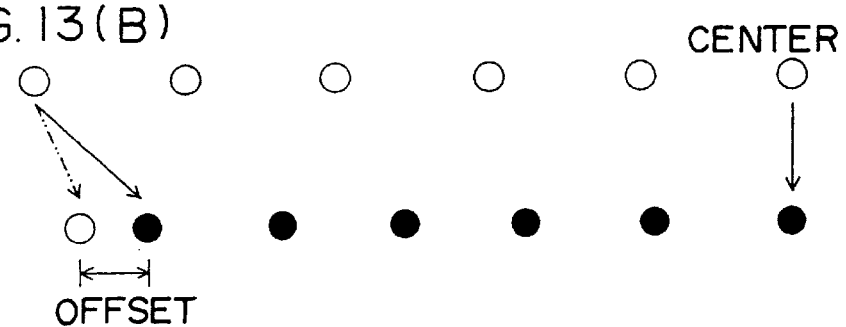

To eliminate the above-mentioned problem, the digital image processing apparatus according to the present invention controls the interpolation coefficient so as to prevent the picture element at the center of the screen from being out of position regardless of the zoom magnification. That is, as shown in FIG. 13(B), an appropriate offset amount (FSETUPH, FSETUPV) is added to the position of the picture element in accordance with the zoom magnification, so that the interpolation operation is not substantially carried out for the picture element at the center of the screen. As a result, even in the case of the sequent zoom operation, the picture element at the center of the screen does not change its position.

Figure 14A:
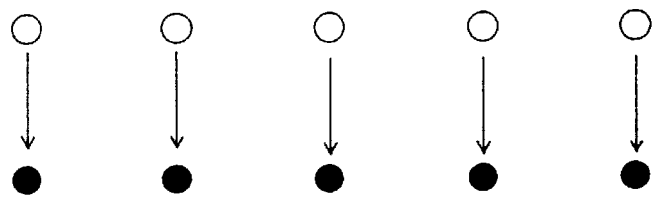
Figure 14B:
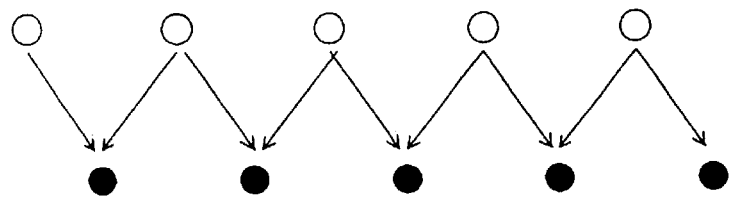

And, there is a difference in the frequency characteristics (the acumination of the image) between the image which is interpolated at the interpolation coefficient of 1 and 0 as shown in FIG. 14(A), and the image which is interpolated by the interpolation operation of ½ and ½ as shown in FIG. 14(B). That is, the image which is interpolated at the interpolation coefficient of 1 and 0 is the most acuminous, and the image which is interpolated at the interpolation coefficient ½ and ½ is the least acuminous. And, in one screen, there are acuminous parts and non-acuminous parts according to the interpolation coefficient and there is a difference in resolution.

To solve the above-mentioned problem, the digital image processing apparatus controls the interpolation coefficient so that the acumination of the image can be uniform. That is, the appropriate quantity of offset is added in accordance with the zoom magnification in the same way as described above, and equalizes the acumination by preventing the image from being interpolated by the interpolation coefficient 1 and 0.

Incidentally, because the control of the interpolation coefficient which corrects the dislocation of the picture element at the center of the screen is different from the control of the interpolation coefficient which equalizes the acumination of the image, it is possible to select one of these two.

As has been described above, according to the digital image processing apparatus of the present invention, the digital image signals of each small block of m×n picture elements are read out from the first memory, which stores the digital image signals for one screen, and are stored in the block memory, and the electric zoom processing together with the interpolation operation are carried out with a small block as a unit. As a result, the electric zoom processing and the other special processing such as the longitudinal-lateral conversion, the right-left conversion and the contour correction can be done in a small circuit, and the low-priced DRAM can be used because any kind of memories can be used as the first and second memories. And, the incongruity (the dislocation of the center and the difference of resolution) can be reduced, and the contour correction in the vertical direction can be carried out in a compact circuit.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A digital image processing apparatus comprising:
    a first memory which stores digital image signals for one screen;
    first memory control means which divides the digital image signals stored in said first memory into small blocks of $m^x n$ picture elements in which the picture elements in a horizontal direction partially overlap each other and reads out the digital image signals every small block;
    a block memory for storing the digital image signals of the small block which has been read out by said first memory control means;
    digital image processing means which carries out an electric zoom processing for the digital image signals of each small block read out from said block memory; and
    a second memory for storing digital image signals which have been processed by said digital image processing means.

2. The digital image processing apparatus according to claim 1, wherein said first memory control means carries out a longitudinal-lateral conversion and a right-left conversion of an image by changing the order to read out a digital image signal from said first memory and the order to write the digital image signal in said block memory.

3. The digital image processing apparatus according to claim 1, wherein:
    said first memory stores a luminance signal and a chroma signal;
    said block memory comprises a luminance block memory which stores the luminance signal and a chroma block memory which stores the chroma signal; and,
    said digital image processing means has two systems for a luminance system and a chroma system.

4. The digital image processing apparatus according to claim 3, wherein chroma signals are stored in said first memory in such a manner that signals $C_b$ and $C_r$ are alternately stored and an order thereof is reverse in an odd number line and an even number line.

5. The digital image processing apparatus according to claim 3, wherein said digital image processing means for processing the luminance signal has contour correction means which performs a contour correction for a digital image signal in a vertical direction in accordance with digital image signals which have been zoom-processed.

6. The digital image processing apparatus according to claim 5, wherein said digital image processing means controls an interpolation coefficient so as to prevent a picture element at a center of a screen from being out of position when electric zooming is carried out.

7. The digital image processing apparatus according to claim 6, wherein said digital image processing means controls an interpolation coefficient so as to prevent the interpolation coefficient from being 0 or 1 when electric zooming is carried out.

8. The digital image processing apparatus according to claim 1, wherein said digital image processing means is operable to interpolate said digital image signals in at least one of a vertical and a horizontal direction.

9. A digital image processing method comprising the steps of:
    a) storing digital image signals for one screen in a first memory;
    b) organizing the digital image signals stored in said first memory into small blocks of m×n picture elements in which the picture elements in a horizontal direction partially overlap each other;
    c) reading out digital image signals corresponding to each small block;
    d) storing the digital image signals corresponding to each small block, which have been read out from said first memory, in a block memory, respectively;
    e) electric zoom processing the digital image signals of each small block read out from said block memory; and
    f) storing the electric-zoom-processed digital image signals into a second memory.

10. The method of claim 9, wherein said step b) carries out a longitudinal-lateral conversion and a right-left conversion of an image by changing the order by which a digital image signal is read from said first memory and the order by which said digital image signal is written to said block memory.

11. The method of claim 9, wherein:
    said step of a) stores a luminance signal and a chroma signal in said first memory; and
    said step d) stores said luminance signal in a block memory comprises a luminance block portion of said block and stores said chroma signal in a chroma block portion of said memory.

12. The method of claim 11, wherein said step a) stores said chroma signals in said first memory in such a manner that signals $C_b$ and $C_r$ are alternately stored and an order thereof is reverse in an odd number line and an even number line.

13. The method of digital image processing apparatus according to claim 11, wherein said step d) includes the step of contour correcting a digital image signal in a vertical direction in accordance with digital image signals which have been zoom-processed.

14. The method of claim 9, further comprising the step of g) interpolating said digital image signals in at least one of a vertical and a horizontal direction.

15. The method of claim 14, wherein said step g) controls an interpolation coefficient so as to prevent a picture element at a center of a screen from being out of position when electric zooming is carried out.

16. The method of claim 14, wherein said step g) controls an interpolation coefficient so as to prevent the interpolation coefficient from being 0 or 1 when electric zooming is carried out.

* * * * *